United States Patent [19]

Johns, Jr.

[11] 4,428,072
[45] Jan. 24, 1984

[54] SEISMIC WELL LOG DISPLAY METHOD AND APPARATUS

[75] Inventor: Samuel E. Johns, Jr., Fort Worth, Tex.

[73] Assignee: Gearhart Industries Incorporated, Ft. Worth, Tex.

[21] Appl. No.: 194,238

[22] Filed: Oct. 6, 1980

[51] Int. Cl.³ ............................................. G01V 1/34
[52] U.S. Cl. ...................................... 367/69; 367/33; 367/34; 346/33 WL
[58] Field of Search ...................... 367/33, 34, 68, 69, 367/71; 340/856; 73/152; 346/33 WL, 110 R

[56] References Cited

U.S. PATENT DOCUMENTS

| | | | |
|---|---|---|---|
| 3,093,810 | 6/1963 | Geyer et al. | 367/28 |
| 3,302,165 | 1/1967 | Anderson et al. | 340/856 |
| 3,488,658 | 1/1970 | Tanguy | 367/33 X |
| 3,488,660 | 1/1970 | Stafford | 367/33 X |

Primary Examiner—Maynard R. Wilbur
Assistant Examiner—K. R. Kaiser
Attorney, Agent, or Firm—Hubbard, Thurman, Turner and Tucker

[57] ABSTRACT

Apparatus and method for recording seismic signals on a logging chart as a function of the depth of a logging sonde within a well bore includes apparatus for analyzing the seismic signals. The method utilizes the recording of information relating to the slope of a seismic signal received from the sonde. A recording trace is made using successive horizontal sweeps with no vertical deflection, and presence of a mark on the recording can indicate a positive slope for the seismic signal, and the absence of a mark can indicate a negative slope. An apparatus of the present invention utilizes this method to record well logging information obtained from seismic signals.

6 Claims, 6 Drawing Figures

U.S. Patent
Jan. 24, 1984
4,428,072
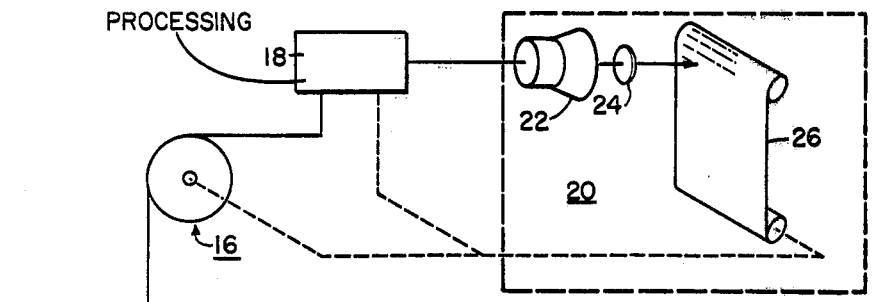
FIG. 1
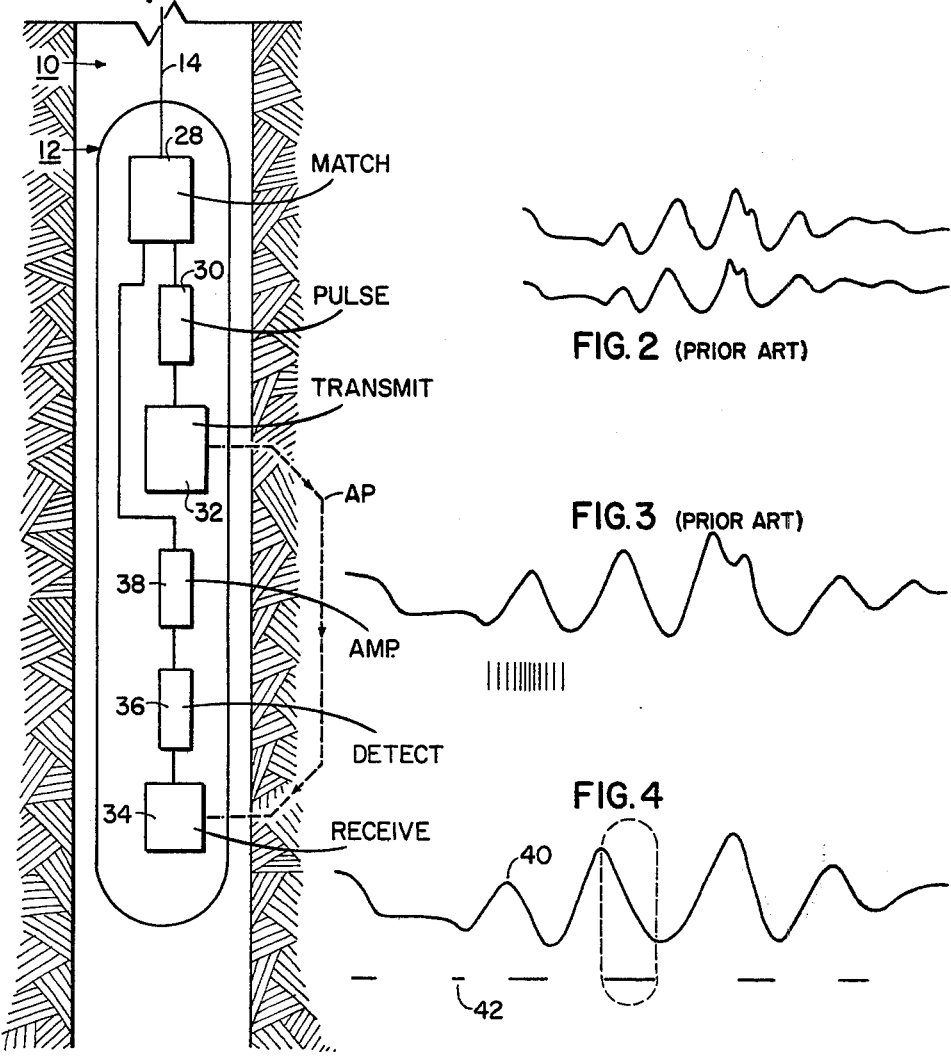
FIG. 2 (PRIOR ART)
FIG. 3 (PRIOR ART)
FIG. 4
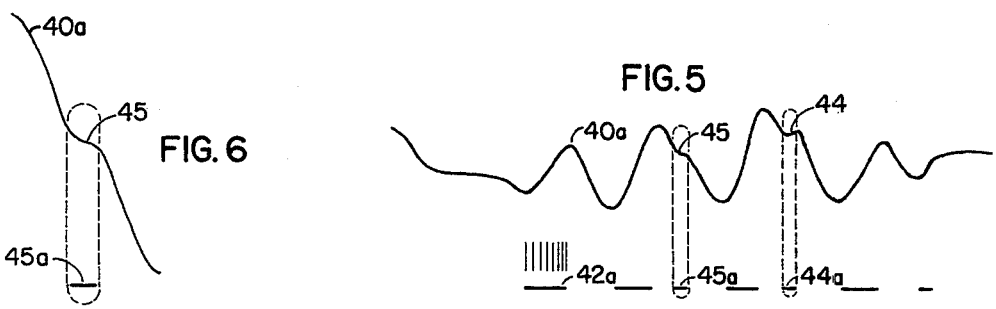
FIG. 6
FIG. 5

SEISMIC WELL LOG DISPLAY METHOD AND APPARATUS

This invention generally pertains to the seismic or acoustic logging of well bores and more particularly pertains to a method and apparatus for providing an improved display of the respective signals as indicated or recorded by the logging apparatus.

BACKGROUND OF THE INVENTION

Early systems and method for seismic well logging is disclosed in U.S. Pat. No. 3,093,810, re-issued as No. RE 25,928, to R. L. Geyer et al. The present invention is an improvement to the system disclosed by Geyer and can be incorporated in the system therein disclosed. Accordingly, the Geyer et al patent is specifically incorporated herewith by reference to supplement the following detailed description.

Useful information concerning prior art seismic log displays may also be found in U.S. Pat. No. 3,302,165 to Anderson et al.

As will be seen herein, the terms "seismic" and "acoustic" are used interchangeably with the same meaning.

In systems such as disclosed by Geyer et al, all the information of an acoustic wave is available to the viewer if the entire wave is displayed in an X-Y manner such as the usual oscilloscope display. Although this is sometimes done at relatively coarse vertical sampling intervals and at a depth scale presentation compatible with other well logs, it is not practical at a desired resolution in the order of, for example, one sample per inch of bore hole depth. If X-Y wave forms were made at this desired vertical resolution, it would require tens of thousands of displays for even a modest length of bore hole and, consequently, they could not be compared directly to other well logs run at normal depth scales.

The Geyer et al system overcomes some of the disadvantages of the X-Y presentation as described above. As may be seen, the Geyer et al system employs successive horizontal sweeps with no vertical deflection and with a trace intensity modulated according to wave amplitude, thus providing an X-Z form of display. Obviously, since little vertical display space is required, the Geyer et al type of display can be presented at desired depth resolution.

One disadvantage of the variable density X-Z display is that not all the wave information essential to some kinds of analysis is discernable.

Since various amplitudes are represented as various "shades of grey" in a manner of speaking, the large and average amplitude changes representative of fundamental single frequency, or of the average of combined frequencies, is readily seen.

However, the small anomalies, local to some portion of the principle gross wave, are not readily discernable, if at all. These are the anomalies that can indicate the beginning of an additional wave (such as an acoustic shear wave) which are very important in some analyses of acoustic logs.

Another disadvantage of the commercially available X-Z variable type display is that only the excursions in one polarity from a reference are presented, permitting the loss of local anomalies in the opposing polarity, even if such local anomalies were otherwise discernable.

The present invention provides a new type of display which, like the variable intensity display mentioned above, employs successive horizontal sweeps with no vertical deflection, permitting display at any desired depth resolution.

Unlike the earlier systems, the present invention does not employ variable intensity modulation. In contrast, the present invention employs turning the recording beam (or voltage) either on or off in what may be considered a dichotomous or bi-stable form of Z modulation. In this dichotomous Z mode of modulation, the recorded signals are indicative of the polarity of change of amplitude.

The term "polarity of change" may be thought of as another expression meaning the mathematical sign of the derivative of a signal. That is, when a signal is rising, thus having a positive derivative, the signal has a positive "polarity of change." Likewise, when the signal is falling, thus having a negative derivative, the signal has a negative "polarity of change." The "polarity of change" is thus a characteristic having two possible values, depending on whether the signal is increasing (becoming more positive) or decreasing (becoming more negative).

For example, the recording or "on" condition of a signal beam could commence each and every time the amplitude of the acoustic wave form changes from negative-going to positive-going and cease at the next transition from positive-going to negative-going. The intervening spaces of "off" condition of the beam would then continue to the next transition from negative-going to positive-going amplitude, thus beginning the next recording period.

In another embodiment the "recording" and "space" periods could just as well represent the opposite sense of signal amplitude change.

The detection of amplitude sense reversals may be readily detected by digitizing the wave form and computer-picking such reversals, as slightly delayed from real time, or alternately to make the same determinations in an analog manner. It will be seen that important local anomalies are clearly discernable by the display herein described.

Alternately, the recording period may begin with a reversal in the direction of amplitude change and end with the next reversal to the opposite polarity as previously described, but rather than being a constant maximum mark condition as previously described, the intensity during the recording period could be varied according to amplitude as is done in the earlier X-Z system shown by Geyer et al.

In a further modification of the present invention, a display system is provided that will indicate local anomalies regardless of whether a reversal of direction of amplitude change occurs or not. In such modification, the trend of the amplitude change is established and a next amplitude value is predicted by extrapolation with the predicted amplitude value compared to the actual value to establish a "variance" from the predicted amplitude value regardless of the sign of the variance. Such variance may then be employed by means of sensing variances in excess of a chosen "maximum permissible variance" and displaying a recording during periods during which the variance is in excess of the maximum permissible value.

This described maximum permissible variance is adjusted so that, during a single frequency wave or a wave of combined frequencies which are devoid of any distinct local anomalies, the maximum permissible variance would be exceeded only during the time or near the time that the reversals associated with the peak values of the wave are exceeded. The system herein described also indicates all local anomalies that create variances in excess of the maximum permissible variance.

In a preferred method of accomplishing the above described variance control display, the wave form is digitized and compared with previous and/or subsequent values in the wave form to create an arithmetic difference. When said difference has exceeded a preset maximum difference, then a recording is shown. Digital computers presently in commercial use in well logging systems can be programmed to accomplish the foregoing.

SUMMARY OF THE INVENTION

A principle object of the present invention is to provide an acoustic well log display which will indicate anomalies caused by complexities in the gross wave which are important in analysis.

Another object of the present invention is to provide a display wherein important local anomalies are clearly discernable.

Still another object of the present invention is to provide a display which will indicate local anomalies whether or not a reversal of direction of amplitude change occurs.

The foregoing and other objects of the present invention are attained in a method for recording a display of recurrent seismic signals including the steps of, transmitting the signals through an electrical cable from a sonde within a well bore to the earth's surface, repeatedly receiving each signal of such signals as a changing signal voltage and discriminating the polarity of change of such signal voltage. For each signal an intermittant recording voltage which is dichotomous in nature is produced during only a designated polarity of change as a function of time. A chart record is displayed through a distance which is a function of the movement of the logging sonde within the well bore and the recording voltage is recorded along a coordinate across the chart record as a discrete dichotomous X-Z curve which is located as a function of the position of the sonde in the well bore. Apparatus suitable for use in performing the foregoing method is also provided.

BRIEF DESCRIPTION OF THE DRAWING

FIG. 1 is a schematic illustration of a seismic well logging system including a sonde, a transmission cable, receiving means and recording means;

FIG. 2 illustrates typical X-Y displays such as made by the prior art;

FIG. 3 is an illustration of the variable intensity X-Z record as disclosed in the prior art;

FIG. 4 is an illustration of a convention X-Y display along with a dichotomous X-Z display provided by the present invention;

FIG. 5 is similar to FIG. 4 and showing two small exursions of a different kind in a larger wave form and the dichotomous record of each; and FIG. 6 is an enlargement of a portion of FIG. 5 showing one of the two excursions in greater detail.

DESCRIPTION OF A PREFERRED EMBODIMENT

Referring to FIG. 1, there is shown a well bore 10 in which is located a well logging sonde 12 suspended from an electrical hoisting cable 14. At the earth's surface is located a well logging unit (not shown) in which a hoisting unit 16 is provided to pay out and reel in the electrical logging cable as desired.

In electrical connection with the logging cable 14 is a signal receiving and processing unit 18. The receiving and processing unit 18 includes a programmable digital computer or data processor of a kind as now in commercial use in well logging units in the United States and abroad. The receiver 18 is mechanically or otherwise suitably connected to the hoisting unit 16 to provide appropriate signals indicative of the depth and change in depth of the sonde 12 within the well bore 10. The receiver 18 is connected into a recorder 20 which includes an oscilloscope having a cathode ray tube (CRT) 22. The display appearing on the face of CRT 22 may be projected through an appropriate lense system 24 onto a movable recording chart 26.

Referring now to the logging sonde 12, it is seen that the electrical connectors of the logging cable 14 are connected into an appropriate matching section 28. Depending on the other measuring elements incorporated into the logging sonde 12 and the particular kind of logging system used, the electrical cable 14 may have a large number of electrical conductors with the sheath of the cable or one of the conductors usually serving as the ground connector.

Electrical power is provided through the cable 14 and matching section 28 into a pulsing circuit 30 which in turn is connected into a seismic pulse transmitter 32.

A pulse detector or receiver 34 is provided within the sonde 12 at a spaced apart distance from the transmitter 32. As shown, the receiver 34 is located below the transmitter 32 but the system is equally operable with the receiver positioned above the transmitter.

Connected to the pulse receiver 34 is a detection circuit 36 which in turn feeds through an amplifier 38 into the matching section 28 and on upwardly through respective electrical connectors in the cable 14 into the signal processing unit 18.

In operation, the sonde 12 is usually lowered to below the earth formation zone to be inspected and thereon raised at a constant rate up through such zone. The pulse transmitter 32 is actuated to project a seismic pulse into the surrounding formation at repeated intervals, for example, such that a pulse is emitted for every one-half foot (for example) that sonde 12 is moved up through the well bore 10.

The acoustic pulse from transmitter 32 passes into the earth formation surrounding well bore 10 and passes downwardly through such formation and back into the well bore 10 to be detected and received by the receiver 34. The general path of such an acoustic or seismic pulse is shown as acoustic path AP in FIG. 1 by the dashed line extending into the earth formation from transmitter 32 to receiver 34.

FIG. 2 illustrates seismograms such as provided by the prior art, for example, such as shown in FIG. 2 of the previous cited patent to Geyer et al and also in FIGS. 3 and 4 of U.S. Pat. No. 3,302,165 to Anderson et al.

FIG. 3 also shows a typical seismogram curve as provided in the prior art along with a variable density presentation or display such as shown in FIGS. 2 and 3 of the previously cited patent to Geyer et al.

FIG. 4 illustrates another typical seismogram curve 40 as provided in the prior art along with one line of a dichotomous X-Z curve 42 as provided by the present invention. Though not shown, a multiplicity of such curves 42, when repeatedly recorded along a moving region of the recording chart 26, will present a display of profiles varying dichotomously along the respective X-Z coordinates. Such a display, though somewhat related to the display shown in FIG. 3 of Geyer et al, is far more clearly defined due to the dichotomous nature of each curve. With sufficiently close spacing the curves overlap to present a dichotomous profile.

FIG. 5 shows another typical seismogram curve 40A with a corresponding dichotomous curve 42A underneath. The principle differences between the curve 40 and 40A and the dichotomous curves 42 and 42A is that small excursions such as shown at 44 in curve 40A will appear in the dichotomous curve 42A as shown at 44A.

Also of note is that the slope or polarity of change of the excursion 44 need not be reversed in some embodiments of the invention to show on the dichotomous curve but rather may be of sufficiently low rate of change to appear as an excursion (an example is shown as excursion 45 and at 45A on the curve 40A, best shown in FIG. 6). The dichotomous curve 45A indicates that the curve 40A has deviated from the predicted next amplitude value by an amount greater than the pre-selected "maximum permissible variance" as described above.

As previously mentioned, the receiver 18 may include a digital computer or data processor as presently in commercial use in logging units such as described. In such event, the curve 40 such as shown in FIG. 4, for example, is sampled in many increments and the instant voltage detected at each sample is given digital identification. Such "bits" of digital identification are then processed through the computer as appropriately programmed, all within the realm of the current state of the art.

The changes in slope of the curve of the reversed polarity excursion 44 shown in FIG. 5, or alternately the change of slope of excursion 45, are programmed into the computer.

One such computer which has been in field use for several years by GO Industries, Inc. is mentioned by way of example only. This computer is the Raytheon 500 as provided by Raytheon Company, Raytheon Data Systems, 1415 Boston Providence Turnpike, Norwood, MA 02062.

It will be obvious to those skilled in the art that various modifications and changes may be made to the embodiment of the invention herein disclosed without departing from the spirit of the invention as defined by the appended claims.

What is claimed is:

1. In a method of recording a display of recurrent seismic signals produced from a sonde moved by an electrical cable through a well bore, the steps comprising:
 (a) transmitting said signals through said cable from said sonde to the earth's surface;
 (b) repeatedly receiving each of said signals as a changing signal voltage;
 (c) discriminating the polarity of slope of each said signal voltage;
 (d) producing an intermittent recording voltage during a designated polarity of slope of said signal voltage as a function of time, wherein said recording voltage is dichotomously modulated along a Z axis;
 (e) displacing a chart record through a distance which is a function of the distance said sonde is moved through said bore hole; and
 (f) recording each said recording voltage along a coordinate across said chart record as a dichotomous record located on said chart record in accordance with the position of said sonde within said well bore.

2. In a method of displaying recurrent seismic signals produced from a sonde moved by an electrical cable through a well bore, the steps comprising:
 (a) transmitting said signals through said cable from said sonde to the earth's surface;
 (b) repeatedly receiving each signal of said signals as a changing voltage;
 (c) discriminating the polarity of slope of said voltage signal; and
 (d) indicating the occurrence of a designated polarity of slope as a visual dichotomous display along a linear coordinate as a function of time.

3. Apparatus for recording a display of recurrent seismic signals produced from a sonde moved by an electrical cable through a well bore, comprising:
 (a) means for transmitting said signals through said cable from said sonde to the earth's surface;
 (b) means for repeatedly receiving each signal of said signals as a changing signal voltage;
 (c) means for discriminating the slope of each said signal voltage;
 (d) means for producing an intermittant recording voltage during a designated polarity of slope of said signal voltage as a function of time;
 (e) means for displacing a chart record through a distance which is a function of the distance said sonde is moved through said bore hole;
 (f) means for recording each said recording voltage along a coordinate across said chart record as dichotomous X-Z curve located on said chart record in accordance with the position of said sonde within said well bore.

4. The apparatus of claim 3, wherein said voltage producing means produces a voltage when said signal voltage is decreasing.

5. The apparatus of claim 3, wherein said voltage producing means produces a voltage when said signal voltage is increasing.

6. A method of recording a display of recurrent seismic signals produced from a sonde moved by an electrical cable through a well bore, comprising the steps of:
 (a) transmitting the signals through the cable from the sonde to the surface;
 (b) repeatedly receiving each of the signals as a changing signal voltage;
 (c) predicting a trend of the changing signal voltage during a selected polarity of slope;
 (d) determining a predicted value from said trend;
 (e) measuring the actual value of the changing signal voltage;
 (f) producing an intermittent recording voltage whenever the measured value differs from the predicted value by more than a preselected amount;
 (g) displacing a chart record through a distance which is a function of the distance the sonde is moving through the well bore; and
 (h) recording the recording voltage along a coordinate across the chart record as a dichotomous record located on the chart in accordance with the position of the sonde within the well bore.

* * * * *